July 8, 1958 J. EVANS 2,842,757

SYSTEM FOR DATA STORAGE INDEXING

Filed Sept. 24, 1956 4 Sheets-Sheet 1

INVENTOR.
JAMES EVANS

BY

W. F. Presson
ATTORNEY

July 8, 1958 J. EVANS 2,842,757

SYSTEM FOR DATA STORAGE INDEXING

Filed Sept. 24, 1956 4 Sheets-Sheet 2

ADDED DIGIT KEYS

INVENTOR.
JAMES EVANS

BY

ATTORNEY

INVENTOR.
JAMES EVANS

BY

W F Presson
ATTORNEY

July 8, 1958 J. EVANS 2,842,757

SYSTEM FOR DATA STORAGE INDEXING

Filed Sept. 24. 1956 4 Sheets-Sheet 4

INVENTOR.
JAMES EVANS

BY

ATTORNEY

United States Patent Office 2,842,757

Patented July 8, 1958

2,842,757

SYSTEM FOR DATA STORAGE INDEXING

James Evans, Flushing, N. Y., assignor to The Teleregister Corporation, Stamford, Conn., a corporation of Delaware Application September 24, 1956, Serial No. 611,624

9 Claims. (Cl. 340—174)

This invention relates to indexing systems embodying electrical code translating apparatus such, for example, as may be used with digital data storage apparatus or computers for facilitating the assignment of index or address numbers and symbols representative of the locations or "bins" in which items of data are to be stored and subsequently recalled from the storage device.

More particularly the invention provides means for converting item designating index numbers consisting of many digits into coded reference numbers having a substantially lesser number of digits, and which allows the use of greatly simplified selection circuits to effect the storage and read-out of data from a magnetic or other type of data storage device.

Inventory and accounting procedures generally employ numerical or alpha-numerical designations to identify items or accounts, for example, a savings bank pass book number. Such numbers may be assigned serially over a long period of time and often include seven or more decimal digits or letters although at any one time there may be a considerably smaller number of active accounts, there being many assigned numbers which represent inactive accounts or accounts closed out for a variety of reasons.

It has been found desirable when applying a machine system for processing savings bank accounts to retain the pass book numbers for identification of all depositors' accounts. However, the multiplicity of digits in such designating numbers introduces complexity and relatively large costs into the accounting system selection circuits unless some economically feasible method is used to convert the multidigit pass book numbers into simplified machine addresses. The provision of a suitable system for effecting this conversion is the principal object of the instant invention.

For purposes of the following description of the method and apparatus involved, the system will be applied to a savings bank pass book numbering system including six digit depositors' account numbers, although it will be understood that the basic principles and system components are applicable to a great variety of indexing or machine selection problems.

In the illustrative embodiment of the invention disclosed herein, the system becomes operable by adding a single coding character, for example a decimal digit, to the pass book number, this added digit serving as the first digit of a four-digit derived machine address code, the added digit also designating according to a formula four predetermined digits of the original six pass book digits which will be used as the second, third and fourth digits of the machine address.

As an example, if the pass book number to be translated is 956,492, we may add the digit (5) which is to become the first digit of the machine address, and according to the predetermined formula is used to select as significant the second, third, and fourth digits of the pass book number, the first, fifth and sixth digits being discarded. Thus the translated machine address corresponding to pass book number 956,492(5) becomes 5564.

In applications of this method of translation each of the ten decimal digits from 1 to 9 and 0 added to the pass book numbers is utilized to select a different combination of three significant digits from the total of six. For example, if we added the digit 0 to the pass book number instead of the digit 5, the translator could be wired to select the first, second and third digits. The formulas for the translator operations are determined in advance from an examination of the range of pass book numbers, together with a mathematical analysis based on the number of outstanding active accounts and available machine addresses. The formulas are then wired into the translator.

The process of examination of the account numbers during the mathematical analysis is naturally divided into ten steps corresponding to the ten added digits. When in any one step an added digit formula yields duplicate address location numbers, which occurs frequently, then the pass book numbers corresponding to such account numbers are classified as incomplete and are subsequently reexamined using the next higher added digit formula.

It has been demonstrated that by this method of applying ten successive added digit translator formulas to random pass book numbers there results a small residue of pass books to which totally new numbers will have to be assigned, the exact amount depending upon the particular problem, but usually less than one percent.

Having described the process of development of the translator functional operations, the system and apparatus for automatic decoding and translation of the account numbers will now be described with reference to the drawings, in which:

Fig. 1 is a schematic circuit of the account number input keyboard;

Fig. 2 schematically shows the added digit keyboard and associated programming and translating relay circuits;

Figure 1:
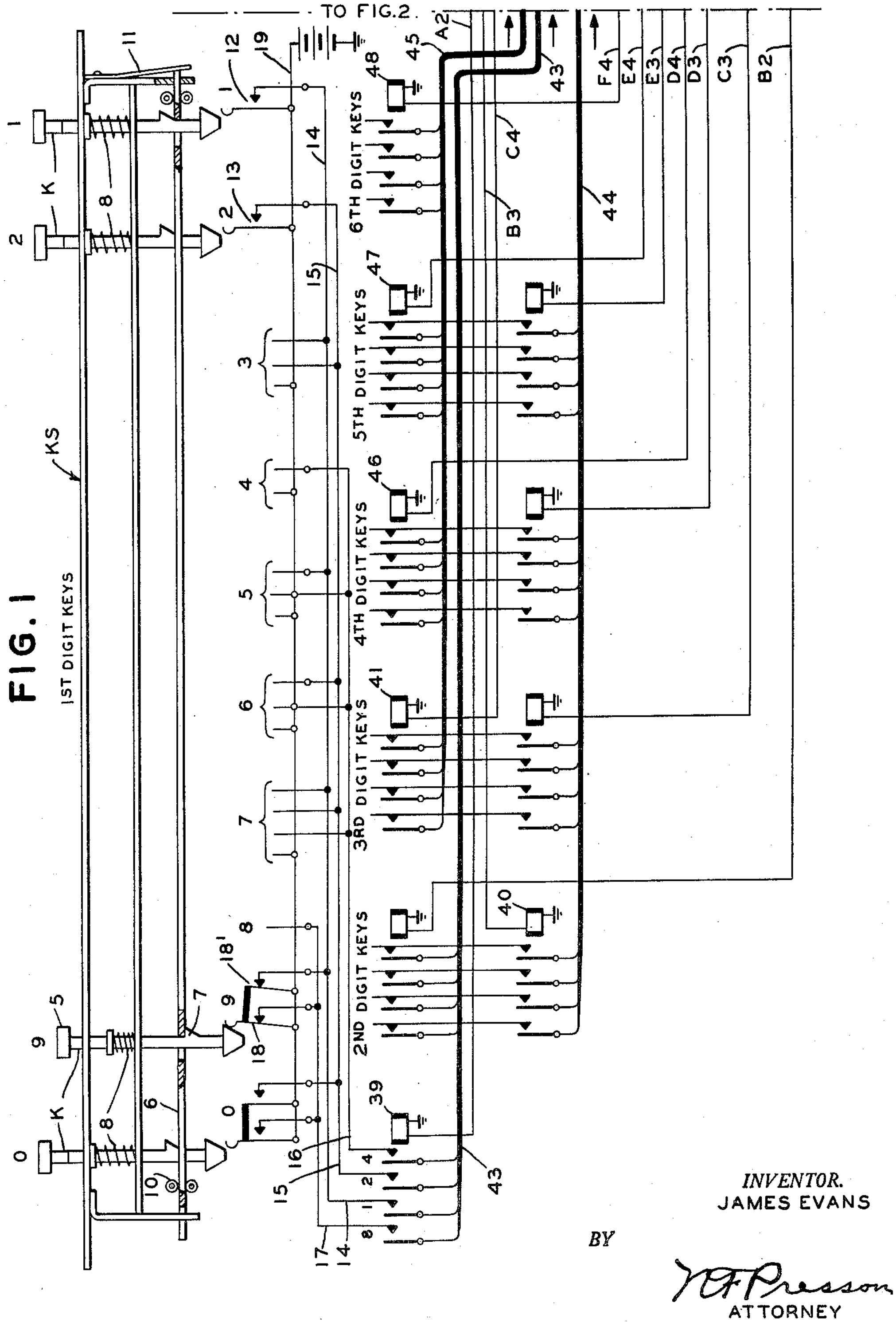

Referring now to Fig. 1, there are indicated six rows of manually operated push button keystrips KS respectively designated as "1st digit keys" to "6th digit keys" and corresponding to the six digits of pass book numbers, there being ten buttons or keys K in each keystrip designated by the digits "1" to "9" and "0" which the buttons respectively represent. The keys for the digits 1, 2, 9 and 0 are seen in detail in the figure, and it will be understood that the keystrip also contains six similar intervening keys respectively for the digits 3 to 8 inclusive and that the contact springs of these keys are connected to the six intervening groups of conductors 3 to 8. The push buttons of these six pass book number recording keystrips are preferably of the interlocking latching type, that is, upon depression of one key only as shown at the key for the digit 9, in each row it remains depressed, being restrained by a bail 6 which engages and latches over a dog as at 7, while all other keys in that row are released and restored to the unoperated position by coil springs 8. The bail 6 is slidably mounted on bearings 10 and is free to move longitudinally against the restraining force of a spring 11 as the key is depressed.

The keys in each row are provided with pairs of make contact springs as at 12 and 13 so disposed and connected to certain of the four code busses 14, 15, 16 and 17 as to energize these code busses selectively from a common source of potential on a bus 19 in accordance with the binary code corresponding to the decimal digit of the key depressed; for example, key "9" when depressed as shown closes contacts 18 and 18' energizing code busses 14 and 17 corresponding to the binary code for the decimal digit nine, that is, 1001.

Figure 2:
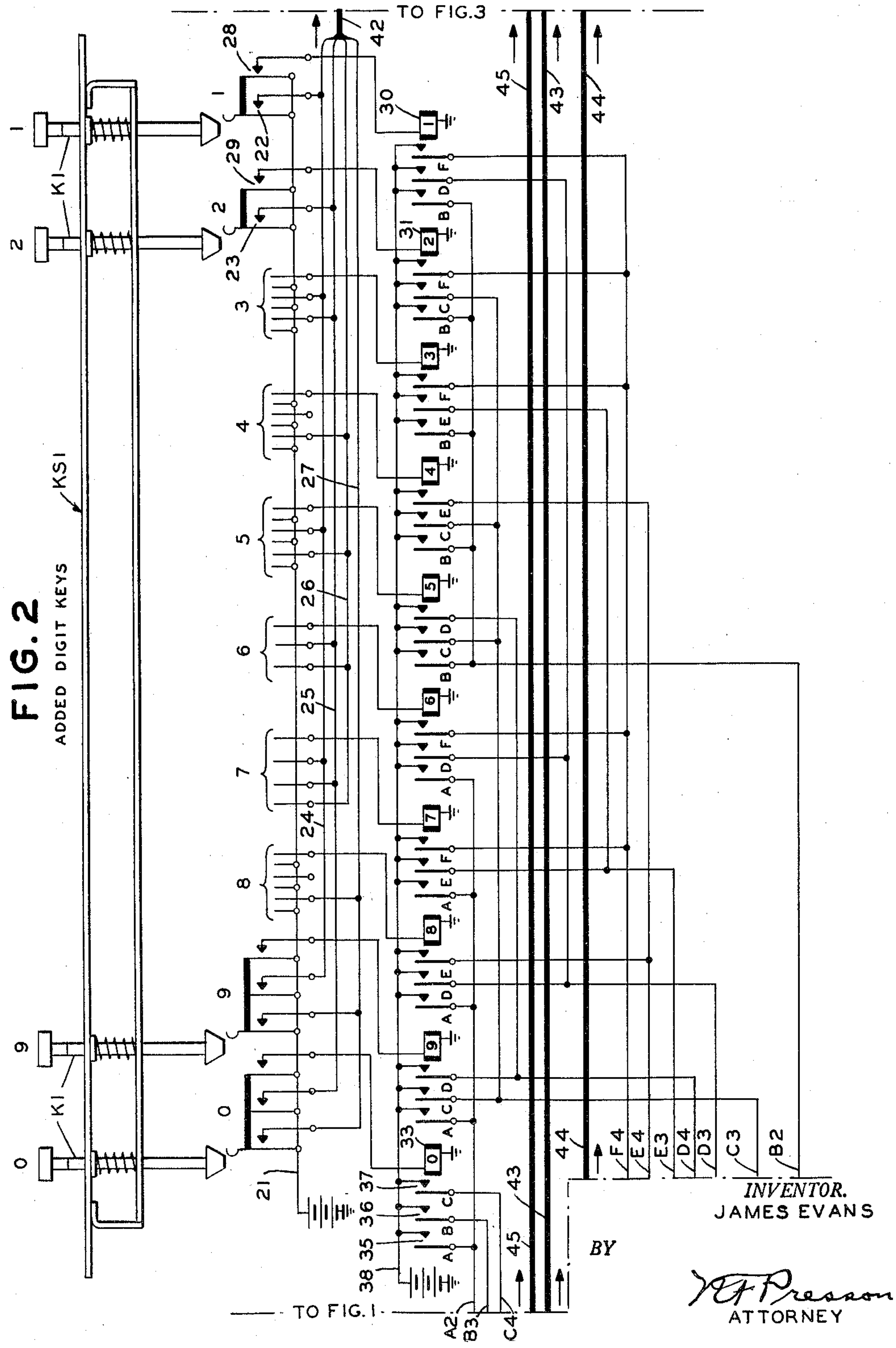

In addition to the six keystrips K corresponding to the six digits of the pass book numbers, there is an added programming keystrip KS1, Fig. 2, with ten buttons or keys K1 which are provided for entry of a digit from 1 to 9 and 0 to be added to the pass book number as previously explained. It will be noted that these keys K1 are of the non-latching type, and are also equipped with contacts as 22, 23, etc., arranged for binary coding of four translator output busses 24, 25, 26 and 27, which are selectively energized from a common source of potential on a bus 21. In addition to the code contacts each key is provided with one contact as at 28, 29, etc., connected to the windings of ten programming relays 30, 31, etc., for the digits "1" to "9" and "0" corresponding to the added digit keys. It will be seen, for example, that the depression of the key corresponding to added digit (0) will energize binary code leads 25 and 27 and also operate relay 33 designation (0).

The operation of relay 33 closes its three pairs of make contacts 35, 36 and 37 from the common source of potential on a bus 38 to energize, over conductors A2, B3 and C4, the windings of three translator relays 39, 40 and 41, Fig. 1, which are connected with their four contacts in the binary code leads 14 to 17 from the keystrips KS corresponding to the first, second and third digits of the pass book numbers. The closure of these relay contacts effects the extension of these three sets of code leads to the second, third and fourth groups of translator output leads which are assembled in cables 43, 44 and 45; the first group, which are assembled in cable 42 seen at the right in Fig. 2, are connected directly to the contacts 22, 23, etc., of the added digit keys. It will be noted that in this operation, program "0," the other translator relays such as 46, 47, 48, etc., remain unoperated and hence the corresponding fourth, fifth and sixth digits of the pass book number remain unused and do not appear in the translated output code.

The operation of the translator upon depression of the ten programming keys K1 will be evident from the following typical chart table and the cross connections (A2, B2, B3, C3, C4, D3, D4, E3, E4 and F4) between the contacts of the programming relays 30, 31, etc., of Fig. 2 and the windings of the translator relays 39, 40, etc., of Fig. 1.

| Added Programming Digit | Pass book digits selected | | | | | |
|---|---|---|---|---|---|---|
| | 1 | 2 | 3 | 4 | 5 | 6 |
| (1) | ---- | x | ---- | x | ---- | x |
| (2) | ---- | x | x | ---- | ---- | x |
| (3) | ---- | x | ---- | ---- | x | x |
| (4) | ---- | x | x | ---- | x | ---- |
| (5) | ---- | x | x | x | ---- | ---- |
| (6) | x | ---- | ---- | x | ---- | x |
| (7) | x | ---- | ---- | ---- | x | x |
| (8) | x | ---- | ---- | x | x | ---- |
| (9) | x | ---- | x | x | ---- | ---- |
| (0) | x | x | x | ---- | ---- | ---- |

Figure 3:
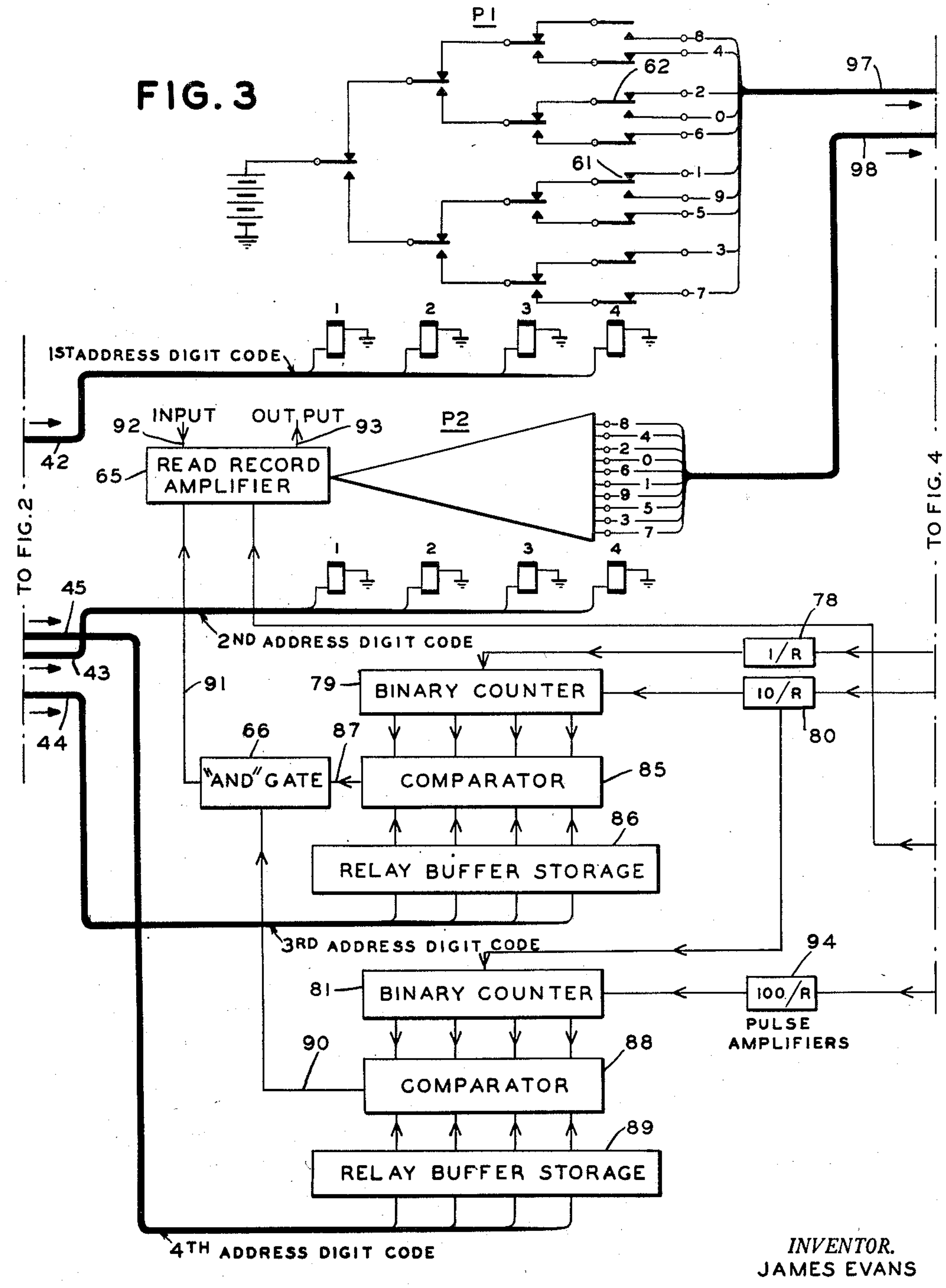
Figs. 3 and 4 show schematically how the location number output of the translator of Fig. 2 is utilized to select magnetic drum storage locations or "bins;"
Figures 4, 6:
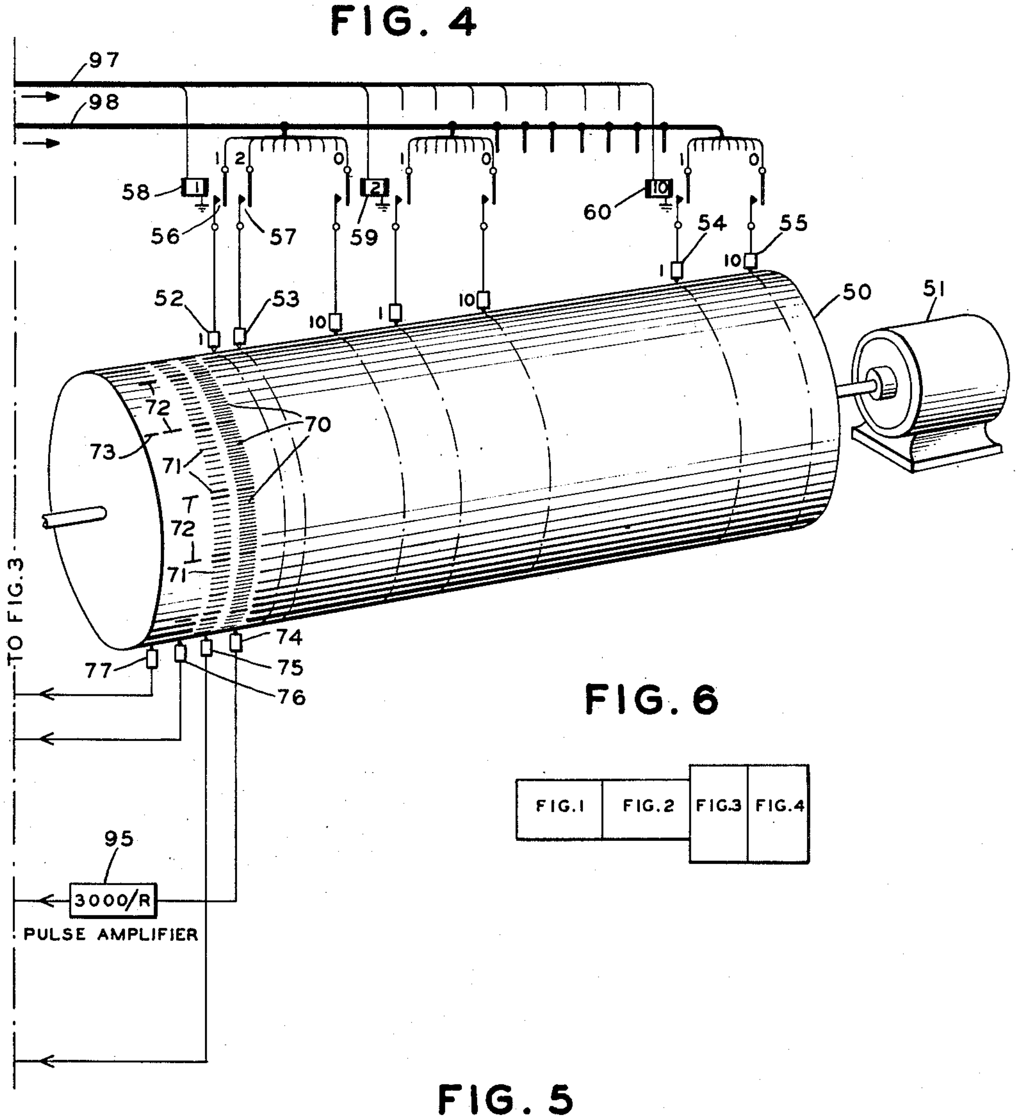
Fig. 6 diagrammatically shows how Figs. 1 to 4 may be arranged to trace the circuit connections of the system.

Referring now to Figs. 3 and 4, there are indicated schematically a preferred arrangement for utilizing the four groups of binary coded decimal signals from the translator to effect selection of signal storage portions, sometimes called "bins," in a signal storage system.

Various known forms of signal storage means, for example, magnetic core matrices, storage tubes, electromagnetic relays and the like, may be employed, in which different portions thereof may be assigned to the different items or categories of information, although preferably and as illustrated herein the signal storage means comprises a drum cylinder 50, Fig. 4, coated with a magnetizable surface, which is rotated at a uniform speed by a motor 51. Disposed axially along the drum in close proximity are one hundred transducer heads 52, 53, 54, 55, etc., of conventional construction with a single winding for recording and read back of pulses to and from the drum surface, each of the one hundred heads having access to one circumferential recording track or channel as the drum rotates. In this preferred system each track is of sufficient length to record three thousand pulses in serial fashion around the drum, the three thousand pulse positions being divided into one hundred "bins" or logical "word" groups of thirty pulses each, a group being capable of recording a unit of significant information data.

The process of selection involves the choice of one head from the total of one hundred by means of relay circuits, and the subsequent selection of one storage bin from the total of one hundred bins in each track by electronic counting and gating circuits well known in the art.

To accomplish the selection of the desired track, the channel pulse leads from the magnetic heads 52, 53, 54, 55, etc., are arranged in groups of ten leads each in a cable 98, the groups of ten being selected by the contacts 56, 57, etc., of ten group selection relays 58, 59, 60, etc. The group selection relays are in turn operated through decoder relay pyramid contacts 61, 62, etc., of a pyramid P1, Fig. 3, having four code relays 1 to 4 which, when selectively operated over the code conductors in cable 42, energize one output lead out of the ten corresponding to the first digit of the translated address number as set up by the translator output signal code leads 24 to 27, Fig. 2.

In a similar manner the second group 43 signal output is decoded by relay pyramid contacts of a pyramid P2, Fig. 3, to select and connect the lead-in cable 98 from one head out of ten, Fig. 4, to the read-record amplifier 65, Fig. 3, so that the one selected channel pulse circuit is complete from the head to the read-write amplifier, the amplifier being gated Off by an And gate 66 in known manner except during the interval when coincidence is indicated by the third and fourth address digit selectors hereinafter described. The term "And" gate is well known in the art, and as employed herein it refers to a gating circuit having two inputs and one output, and in which both input leads have to be conditioned at the same time by the proper potentials in order to produce a control signal on the output lead. The corresponding heads in the ten groups of heads are connected in multiple, as indicated in Fig. 4, since only one of the groups is selected at any time, thus resulting in a crossbar selection system.

Figure 5:
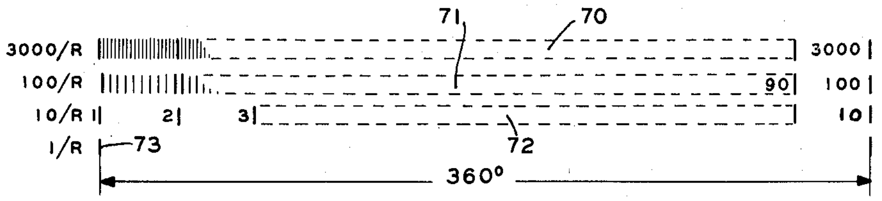
Fig. 5 is a developed chart of four timing pulse tracks around the periphery of the magnetic storage drum of Fig. 4.

Magnetic drum 50 is provided with four permanently inscribed clock or timing pulse channels 70, 71, 72 and 73, each channel or track being equipped with reading heads 74, 75, 76 and 77, respectively. The track 70 contains three thousand recorded pulses for gating the recording and read-out of individual data pulses, these timing gate pulses being arranged in one hundred groups of thirty pulses each with the space of one pulse intervening between each group of thirty. Opposite these one hundred intervening spaces in track 71 are one hundred bin counter and reset pulses, as indicated in the developed view of the clock pulse tracks, Fig. 5, effectively dividing the circumference of the drum into one hundred bins. In order conveniently to generate the counting and reset pulses for operation of the binary counters which must be reset to blank (zero count) following each count of ten, the two additional clock tracks 72 and 73 are provided having ten pulses and one pulse per revolution respectively spaced as indicated in Fig. 5.

Clock pulse channel 73 provides one pulse for each revolution of the drum, this "start" pulse preceding all other counting functions and providing through head 77 and an amplifier 78, Fig. 3, a reset pulse to the third address digit counter 79 which normally registers a ten count at the end of one revolution. Clock pulse channel 72 provides ten pulses for each revolution of the drum which are amplified by a pulse amplifier 80 to step the third address digit binary counter 79 and to provide also a reset signal to the fourth digit counter 81 following each count of ten.

There are therefore provided one binary counter 79 which counts to ten and is reset to blank each revolution of the drum and another binary counter 81 which counts to ten and is reset ten times for each revolution of the drum, thereby establishing a binary decimal numbering scheme for the "bins."

Associated with counter 79 is a code comparator 85 and a relay buffer register 86 which operate to open one leg and the double "And" gate 66 through lead 87 whenever the binary count from the drum clock channel 72 agrees with the third address digit binary code in register 86. Likewise comparator 88 and buffer register 89 cooperate with binary counter 81 to open the other leg of the "And" gate 66 through lead 90 when the count from channel 71 agrees with the fourth address digit.

When both binary counters correspond with the binary code number in the relay buffers, gate 66 opens and activates the read-record amplifier 65 through lead 91 allowing this amplifier to pass thirty pulses from the input or output circuits 92 or 93 to or from the selected head, at the instant the selected bin is passed under the selected head.

The specific circuits and apparatus shown herein are for the purpose of disclosing the principles of the invention, but it is to be understood that the scope of the invention as defined in the claims herein comprehends various changes and modifications that may be resorted to by those skilled in the art.

What is claimed is:

1. In a data processing system including an input device for encoding a group of item-designating characters, means including a translator for selecting from said coded item-designating characters a group of item address character codes, lesser in number than the item-designating characters, and means for adding to the item-designating character input codes additional programming code signals to variably control the translator selection function.

2. In a data processing system in which a large number of inventory items respectively are designated by different groups of characters, signal storage means having different portions respectively for storing signals representing the values of the different inventory items, selection apparatus controlled by character code signals for selecting a portion of the storage means corresponding to a desired inventory item, and means for effecting the selection of an item by utilizing a smaller number of characters than those in the item-designating group, comprising means for producing and temporarily storing signals representing each of the characters in said item-designating group, means for producing signals representing a predetermined added coding character and circuit means operative in response thereto for selecting only certain ones of the temporarily stored characters of the item-designating group and disregarding the remaining characters of the group, and means controlled by the combination of said added coding character and said selected ones of the item-designating characters for causing said selection equipment to select the proper storage portion of the storage means.

3. A system according to claim 2, including a keyset having rows of manually operable keys for selectively setting up the group of characters comprising the designation of a desired inventory item, and in which the means for temporarily storing signals representing each of the characters in the item-designating group is controlled by the selective actuation of said keys, said keyset having another group of manually operable keys each for setting up an added coding character, and circuit means controlled by the actuation of a selected one of the last named keys for selecting only certain ones of the temporarily stored characters of the item-designating group.

4. A system according to claim 2, in which signals representing the values of the inventory items respectively are stored on scanning tracks arranged in groups on a magnetic storage member, means including magnetic transducer heads selectively operable for scanning said storage tracks for reading out or writing in signals therein, means controlled by the combination of said added coding character and the selected item-designating characters for causing the selection equipment to select (1) a particular group of said storage tracks, (2) a particular track in the selected group, and (3) a particular portion of the selected track in which the value of the desired item is stored.

5. A system according to claim 4, including means controlled by the added coding character for causing the selection equipment to select a particular group of said scanning tracks, and means controlled by the selected item-designating characters for causing the equipment to select a particular track in the selected group, and a particular portion of the selected track in which the value of the desired item is stored.

6. In a data processing system in which a large number of inventory items respectively are designated by different groups of characters, signal storage means having different portions respectively for storing signals representing the values of the inventory items, selection apparatus controlled by character code signals for selecting a portion of the storage means corresponding to a desired inventory item, and means for effecting the selection of an item by utilizing a smaller number of characters than those in the item-designating group, comprising means including groups of keys and relays controlled thereby for producing and temporarily storing signals representing each of the characters in said item-designating group, means including another group of keys and relays controlled thereby for selectively producing and storing signals representing each of a number of predetermined added coding characters, circuit means interconnecting the first and second named relays for selecting only certain ones of the temporarily stored characters of the item-designating group and disregarding the remaining characters of the group, and means controlled by the combination of said added coding character and said selected ones of the item-designating characters for causing said selection equipment to select the proper storage portion of the storage means.

7. In a data processing system in which a large number of inventory items respectively are designated by different numbers, signal storage means having areas respectively for storing signals representing the values of the inventory items, selection apparatus controlled by character code signals for selecting an area of the storage means corresponding to a desired inventory item, and means for effecting the selection of an item by utilizing a smaller number of digits than those in the item-designating number, comprising means for producing and temporarily storing signals representing each of the digits in said item-designating number, means for producing signals representing a predetermined added coding character and circuit means operative in response thereto for selecting only certain ones of the temporarily stored digits of the item-designating number and disregarding the remaining digits of the number, and means controlled by the combination of said added coding character and said selected digits of the item-designating number for causing said selection equipment to select the proper storage area of the storage means.

8. A system according to claim 7, including a keyset having rows of manually operable keys for selectively setting up the digits of a number comprising the designation of a desired inventory item, and in which the means for temporarily storing signals representing each of the digits in the item-designating number is controlled by the selective actuation of said keys, said keyset having another group of manually operable keys each for setting up an added coding character, and circuit means controlled by the actuation of a selected one of the last named keys for selecting only certain ones of the temporarily stored digits of the item-designating number.

9. A system according to claim 7, in which signals representing the values of the inventory items respectively are stored on scanning tracks arranged in groups on a magnetic storage member, means including magnetic transducer heads selectively operable for scanning said storage tracks for reading out or writing in signals therein, means controlled by the combination of said added coding character for causing the selection equipment to select a particular group of said storage tracks, and means controlled by the selected digits of the item-designating number for causing the equipment to select a particular track in the selected group, and a particular portion of the selected track in which the value of the desired item is stored.

References Cited in the file of this patent

UNITED STATES PATENTS

| | | |
|---|---|---|
| 2,587,532 | Schmidt | Feb. 26, 1952 |
| 2,737,342 | Nelson | Mar. 6, 1956 |